United States Patent [19]
White et al.

[11] Patent Number: 5,453,062
[45] Date of Patent: Sep. 26, 1995

[54] DIFFERENTIAL GEAR ASSEMBLY

[75] Inventors: Stanley B. White, Mt. Ousley; Ruu-Shiarn Lee, Concord West, both of Australia

[73] Assignee: IVG Australia Pty. Ltd., Lidcombe, Australia

[21] Appl. No.: 90,092

[22] PCT Filed: Nov. 25, 1992

[86] PCT No.: PCT/AU92/00626

§ 371 Date: Jul. 23, 1993

§ 102(e) Date: Jul. 23, 1993

[87] PCT Pub. No.: WO93/11374

PCT Pub. Date: Jun. 10, 1993

[30] Foreign Application Priority Data

Nov. 27, 1991 [AU] Australia .................. PK9729

[51] Int. Cl.$^6$ .................................. F16H 48/28
[52] U.S. Cl. .................................. 475/227
[58] Field of Search ...................... 475/226, 227

[56] References Cited

U.S. PATENT DOCUMENTS

| | | | |
|---|---|---|---|
| 2,462,000 | 2/1949 | Randall | 475/226 |
| 2,972,265 | 2/1961 | Walter | 475/226 |
| 3,481,215 | 12/1969 | Howell . | |
| 5,071,395 | 12/1991 | Fahy et al. | 475/227 |
| 5,169,370 | 12/1992 | Dye et al. | 475/227 |
| 5,302,159 | 4/1994 | Dye et al. | 475/227 |

FOREIGN PATENT DOCUMENTS

| | | |
|---|---|---|
| 63629 | 4/1991 | Australia . |
| 2611016 | 8/1988 | France . |
| 1216142 | 8/1989 | Japan . |

*Primary Examiner*—Dirk Wright
*Attorney, Agent, or Firm*—Smith-Hill and Bedell

[57] ABSTRACT

A limited slip differential gear assembly has a rotating housing containing meshing spur gears each turning a gear element which is externally helically toothed. Each gear element meshes with its own externally-toothed gear member which has a larger diameter and drives one of two output shafts between which differential movement is to take place. The meshing helical gear teeth have the characteristic that the efficiency of drive transmission in opposite directions is different and this provides the limited slip. As the axes of rotation of all rotating parts of the assembly are parallel, reduced constructional and operating costs result.

20 Claims, 9 Drawing Sheets

DIFFERENTIAL GEAR ASSEMBLY

FIELD OF THE INVENTION

This invention relates to a differential gear assembly as is used to transmit drive torque from a power source to driven road wheels of a vehicle, and is more specifically concerned with a differential gear assembly having resistance to wheel spin and generally referred to in the art as a limited slip differential.

STATE OF THE ART

The conventional differential gear is a 'free' differential which divides the driving torque equally between the driven ground wheels whilst compensating for differences in the ground speed of the wheels caused by the vehicle cornering or surface irregularities of the ground, or variations in tire sizes.

The free differential is a standard assembly on all but the more expensive motor vehicles. However it has the disadvantage that a loss of traction and driving torque on one wheel results in a corresponding loss in driving torque on the other driving wheel. Surplus torque from the power source will only generate spin in the wheel which has lost traction.

There have been many proposals to design a assembly which would permit unbalanced output torques in the event of loss of traction at one wheel. One such assembly is described in Gleasman U.S. Pat. No. 2,859,641 and is commercially known as the TORSEN differential. This differential utilises inefficient gearing combined with internal friction to generate torque imbalance between output shafts when one driving wheel cannot maintain a required driving torque due to poor ground adhesion.

The limited slip differential assembly taught by Gleasman in the above patent is a complex structure reliant upon efficiency of drive characteristics of worm-wheel gearing or what may be better described as modified crossed helical gearing. The number of tooth engagements is such a layout is limited and this combined with the nature of contact between the teeth of crossed-helical gearing significantly limits the load capacity of such differentials. In recent times the TORSEN differential assembly has found application in vehicles having constant four-wheel drive where axle loading is obviously much less than in conventional two-wheel drive vehicles.

In our earlier U.S. Pat. No. 5,071,395 hereby inserted by way of reference, is described a non-slip differential gear assembly in which intermediate shafts mounted in a housing each carry gearing in mesh with respective axle gears. The set of meshing gears to one output shaft are conventional spur or helical gears having teeth of opposite hand respectively, and the set of meshing gears to the other output shaft are helical gears of the same hand having zero or a very low efficiency of drive between them. In the assembly described in our above patent, reliance is placed on the zero or low efficiency of drive between the set of helical gears of the same hand to prevent wheel spin, whilst the different rotational characteristics of the two sets of meshing gears allows differentialling between axles to occur. The inherent asymmetry of this differential assembly of the prior art, has not found commercial acceptance in private motor cars or trucks as difficulties in its performance reliability and handling characteristics have posed problems which have not yet been solved.

OBJECT OF THE INVENTION

An object of this invention is to provide an improved limited slip differential gear assembly.

SUMMARY OF THE INVENTION

In accordance with the present invention a limited slip differential gear assembly comprises a housing mounted for rotation about a first axis, means for coupling a rotational drive to said housing, two coaxial and spaced gear members having external teeth and respectively mounted in opposite sides of said housing, and pairs of gear elements meshing respectively with each of the gear members and interconnected by spur gears which rotate with respective gear elements; in which gear assembly the axes of rotation of the gear members, the gear elements and spur gears extend parallel to one another and to the axis of rotation of the housing, and the gear elements and gear members have meshing helical teeth of the same hand with the gear members being of larger diameter than the gear elements.

The advantage of having the diameter of the gear member larger than that of the gear element in mesh with it, drive is transmitted more efficiently from the gear member to the gear element than from the gear element to the gear member. It will be noted that the assembly of the invention relies upon the use of parallel shafted, helical gearing of the same hand. However this is not done because of its rotational characteristics but because of the efficiency of drive characteristics between a gear member and a meshing gear element when they exhibit a drive ratio other than 1:1. Such characteristics were previously thought only to be available in worm-wheel and crossed helical gear drives.

A critical dimension of a differential gear assembly if it is to be fitted into a domestic motor vehicle, is the diameter of its housing as this has to meet the ground clearance requirements of the vehicle. The use of parallel shafted gearing in the assembly of the invention allows the development of many more tooth contacts in a given diameter of gear housing of comparable diameter enclosing a crossed helical gearing. This enables the development of a limited slip differential gear assembly having similar characteristics to the TORSEN differential assembly but having greater strength making is adaptable to a wider range of vehicles.

INTRODUCTION TO THE DRAWINGS

The invention will now be described in more detail, by way of examples, with reference to the accompanying largely diagrammatic drawings, in which:

In the drawings

Figure 3:
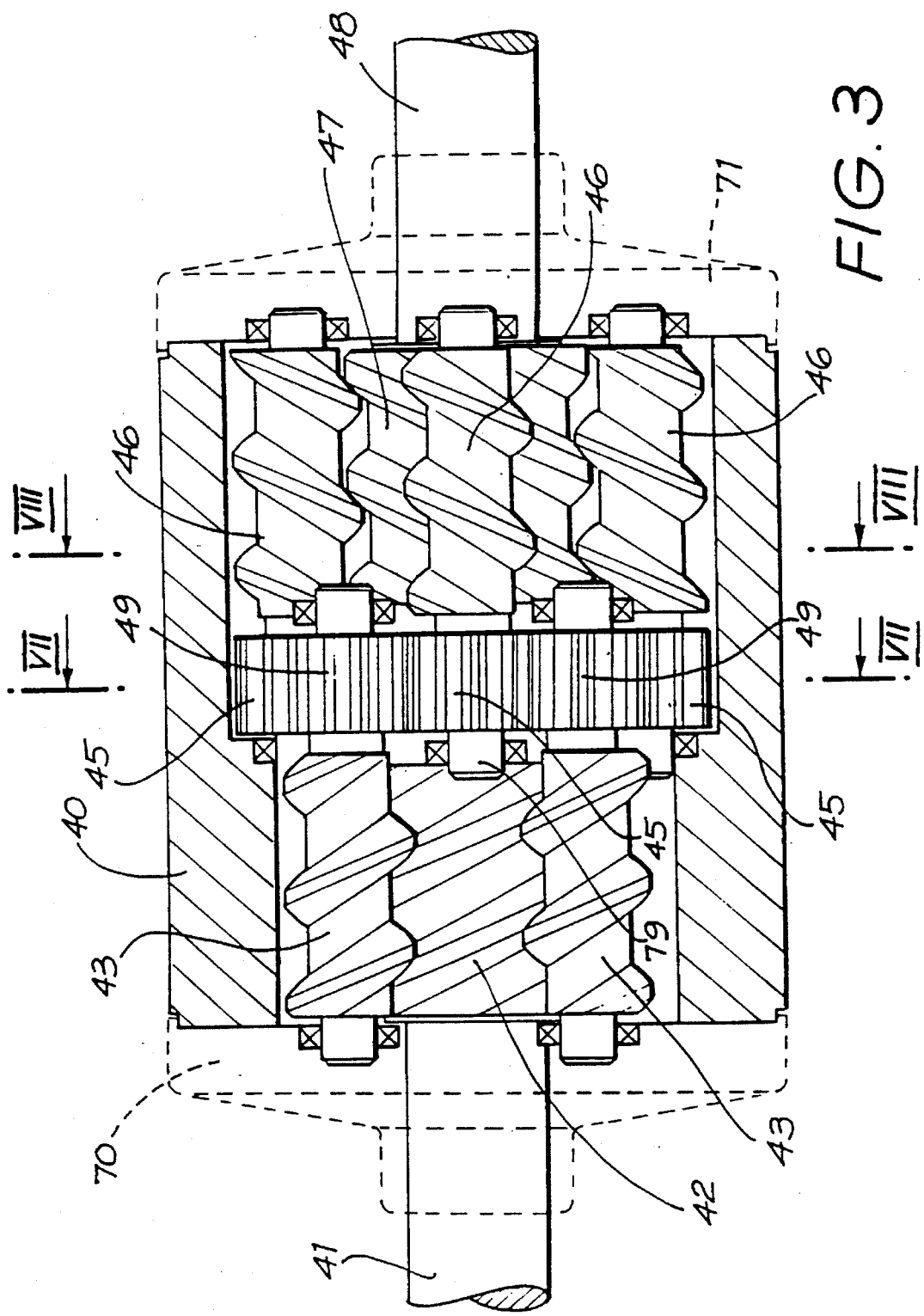
FIG. 3 is a schematic vertical section through a second embodiment of differential gear assembly using eight helical gear elements arranged in four pairs, each pair being inter-connected by spur gearing.
Figure 7:
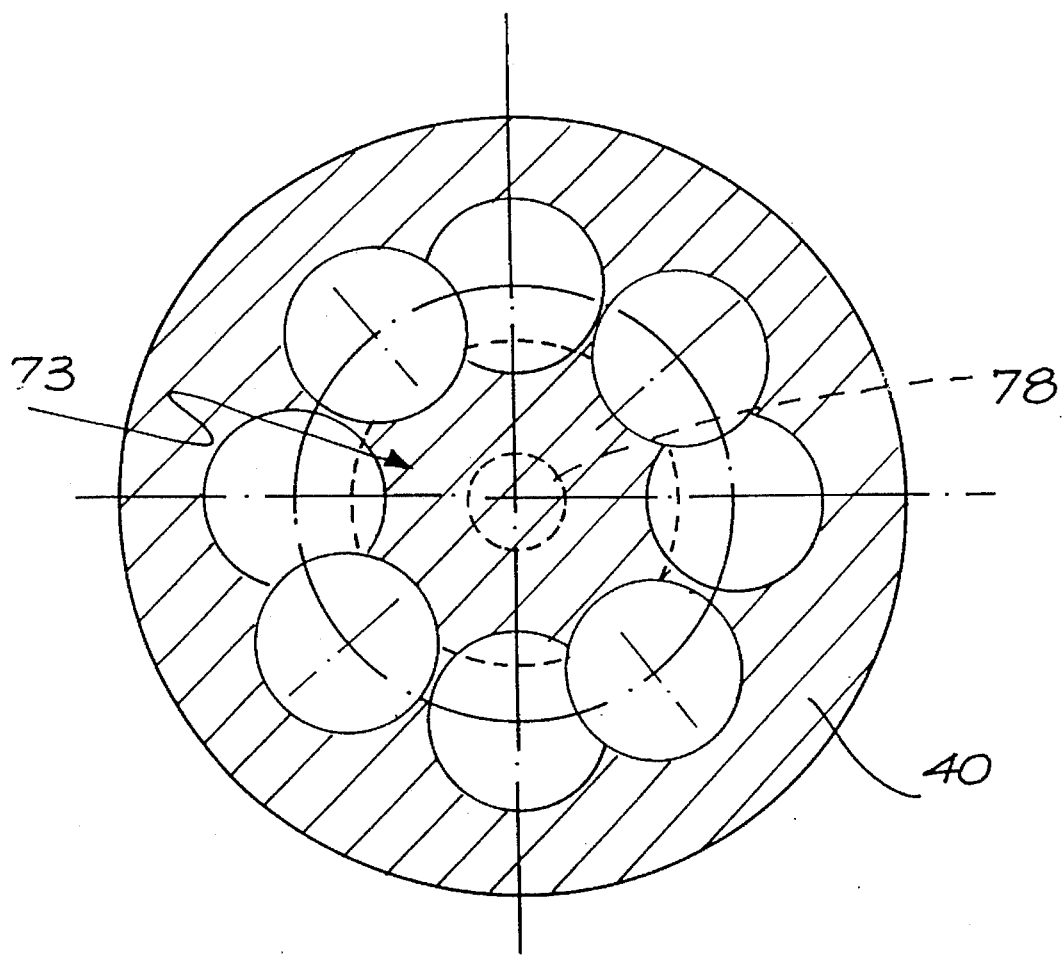
Figure 8:
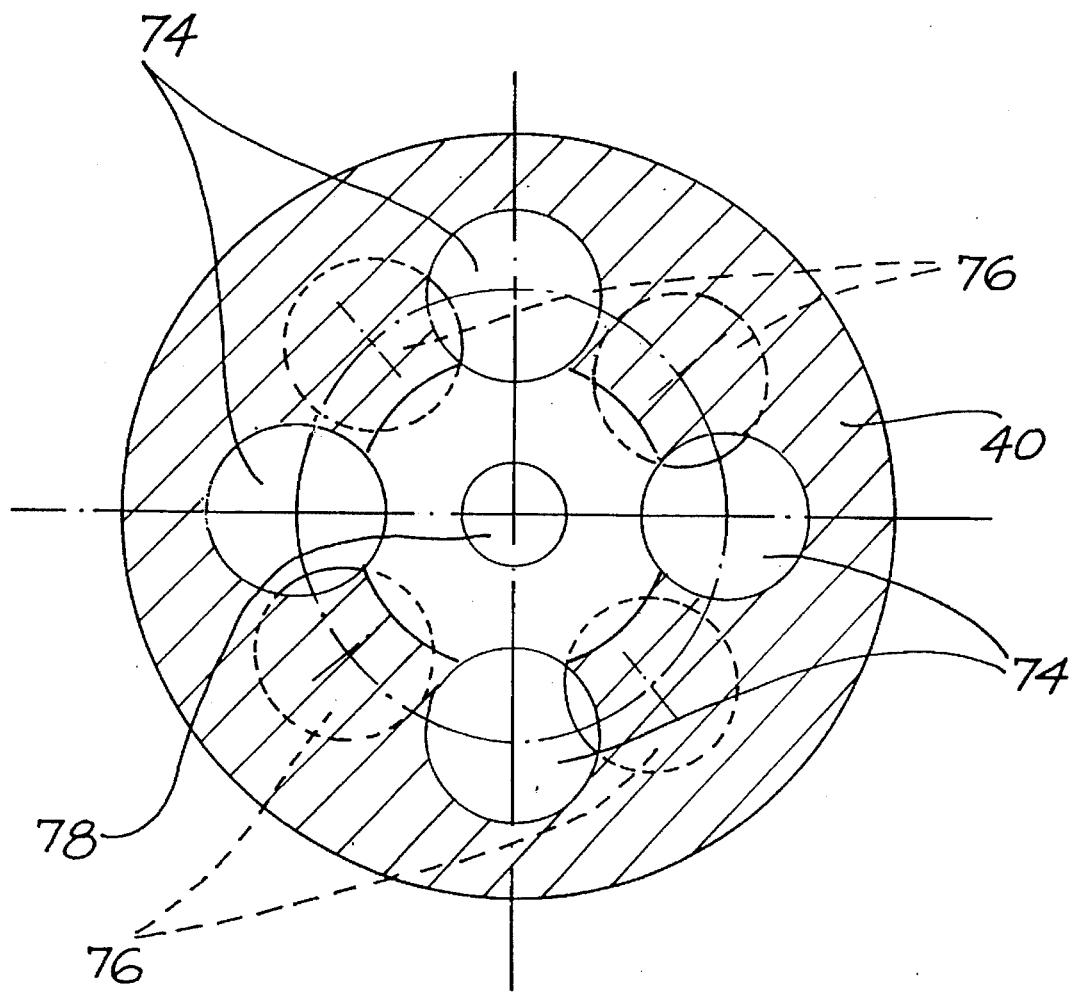
Figure 9:
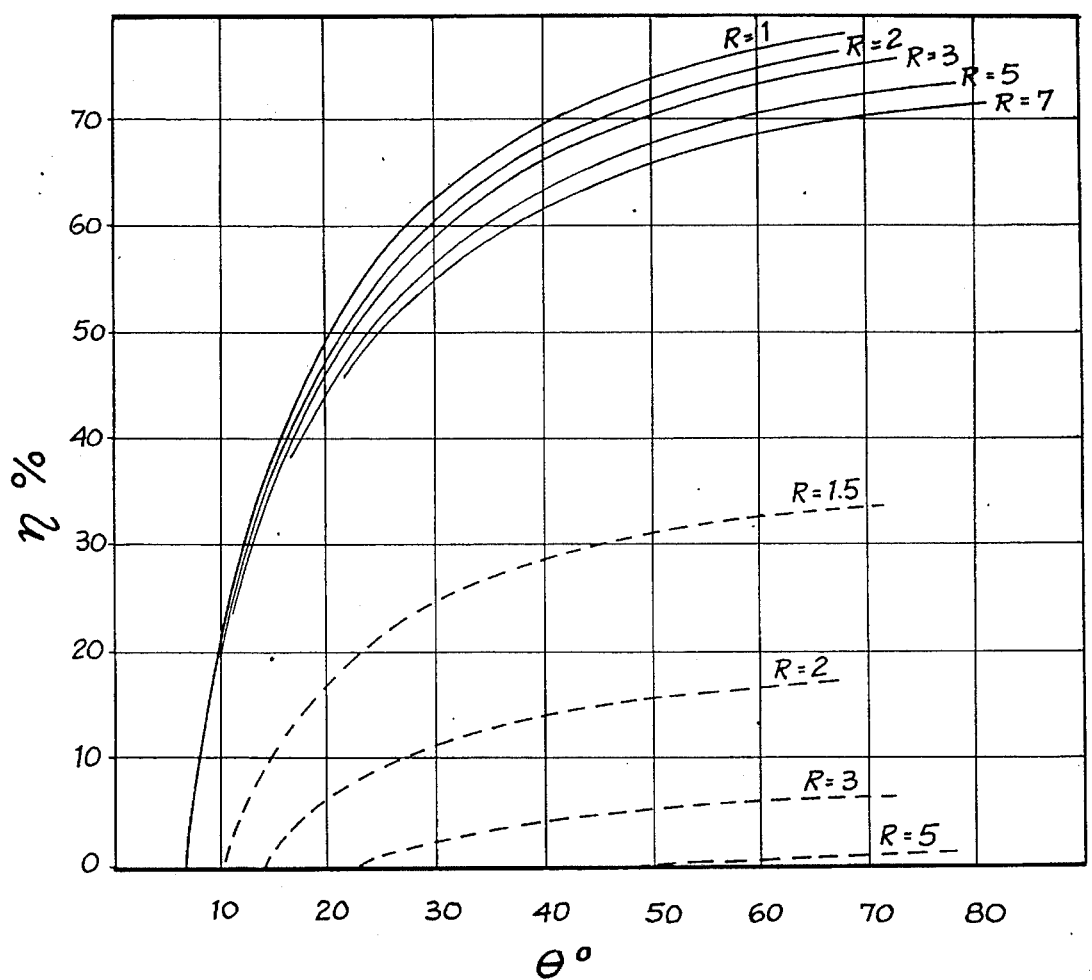

FIGS. 7 and 8 are cross-sections through a housing of the gear assembly of FIG. 3 after removal of the gear members and gear elements, the cross-sections being respectively taken along the lines and in the directions indicated by the arrows VII—VII and VIII—VIII in FIG. 3; and, FIG. 9 is a set of curves of mechanical efficiency ($\eta$) plotted against helical lead angle ($\beta$) for different pairs of meshing helical gears each pair having a different ratio of the gear diameters, the curves showing how the resistance to drive transmission in one direction through the pair of gears is different from the resistance to drive transmission in the opposite direction.

DESCRIPTION OF FIRST EMBODIMENT

Figure 1:
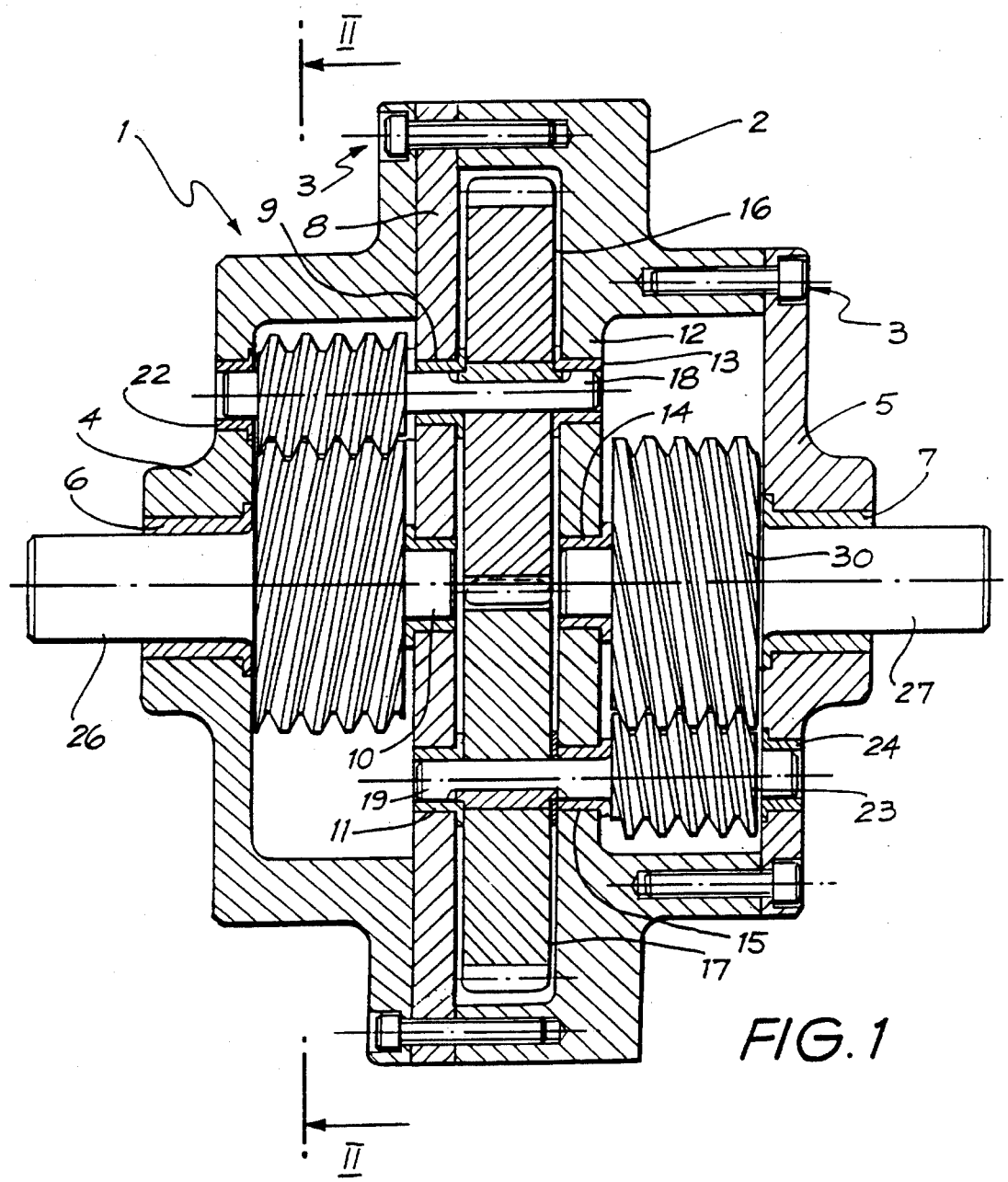
FIG. 1 is a vertical longitudinal section through a first embodiment of differential gear assembly using two helical gear elements inter-connected by spur gearing.
Figure 2:
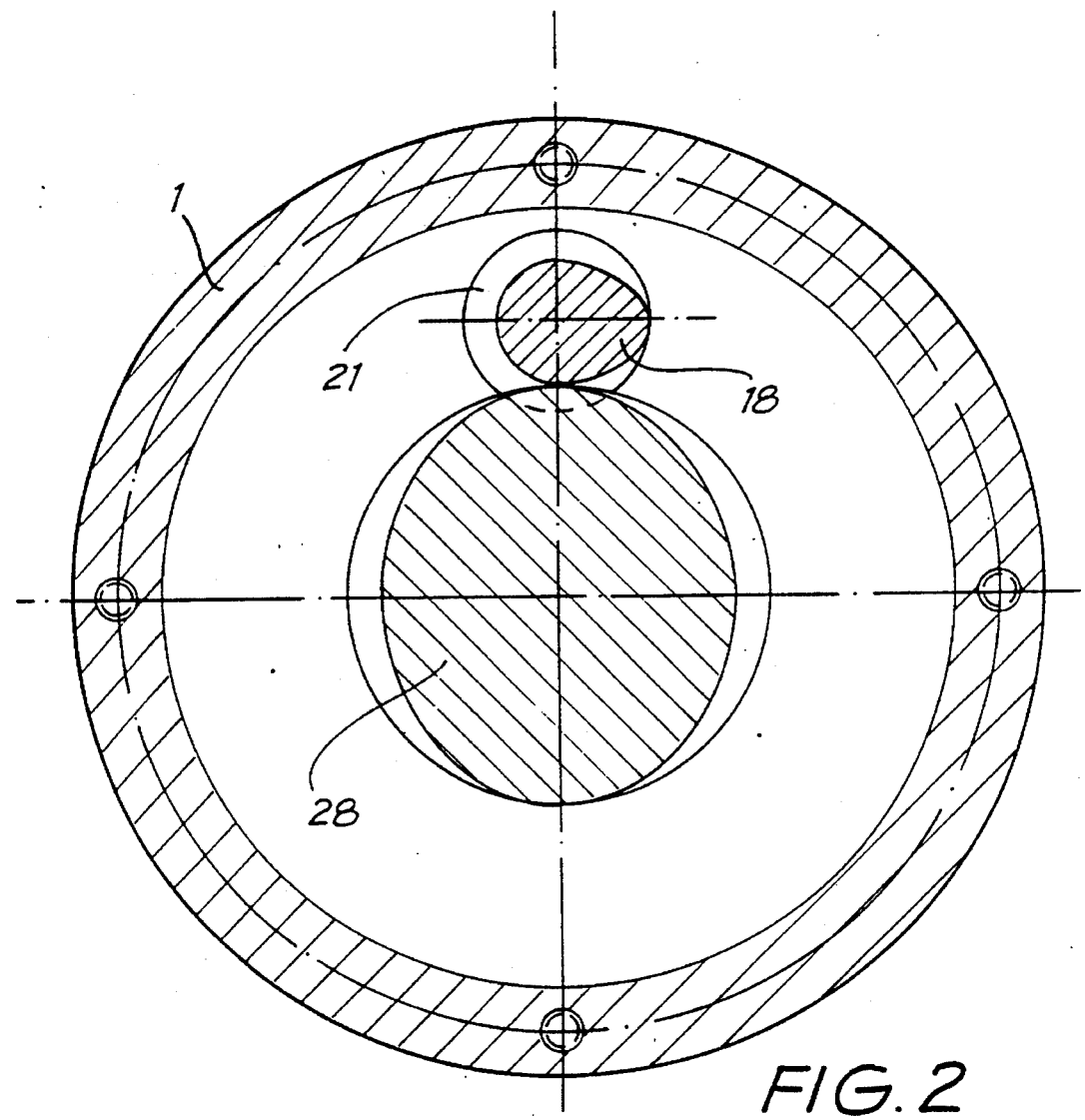
FIG. 2 is a vertical section through FIG. 1 and taken along the line and in the direction indicated by the arrows II—II in FIG. 1.

The layout illustrated in FIG. 1 of the present application, uses a single pair of planetary gear elements and has a generally symmetrical layout.

The assembly comprises a housing 1 provided by an annular casing 2 to which are bolted at 3 respective end plates 4 and 5 containing journals 6 and 7. A web plate 8 is clamped at its edge between the end plate 4 and the casing 2 and provides three apertures 9,10 and 11 serving as journals. The aperture 10 is axially aligned with the journals 6 and 7 on a first axis, and the other two apertures 9 and 11 respectively provide journals which define a pair of second parallel axes displaced from and parallel to the first axis.

A support web 12 integrally formed with the end plate 2 extends across the assembly parallel to, and spaced from the web plate 8. The support web 12 is formed with three apertures 13,14 and 15 providing respective journals and which are respectively aligned with the apertures 9,10 and 11 of the plate 8.

A pair of meshing spur wheels 16 and 17 are located in the space between the plate 8 and the web 12 and are keyed to respective shafts 18 and 19 which are supported on the second axis by the journals provided by the pairs of apertures 9 and 12, and 11 and 15, respectively.

The shaft 18 carries in the space between the plate 8 and the end plate 4 a helically-toothed worm gear element 21. The end of the shaft 18 is held in a journal provided by an aperture 22 in the end-plate 4. In similar manner, the shaft 19 carries a helically-toothed worm gear element 23 in the gap between the web 12 and the end plate 2, and is journalled into an aperture 24 provided in the end plate 2.

Two half-shafts 26,27 between which differential movement is to occur, respectively extend coaxially from opposite sides of the housing 1. The shaft 26 carries a helically-toothed gear member 28 which meshes with the gear element 21 to form a first externally and helically-toothed gear unit, and the shaft 27 carries a helically-toothed gear member 30 which meshes with the gear element 26 to form a second gear unit. The shaft 27 is carried in the journals provided in the apertures 7 and 14, and the shaft 26 is carried in journals provided by the apertures 6 and 10.

Each of the gear units has, what is conveniently termed "plus-plus" characteristics, that is to say that they transmit drive by their meshing gears rotating in the same direction, rather than in opposite directions as is the case with conventional or "plus-minus" gears. We have now found that plus-plus gearing has the additional characteristic of transmitting drive more efficiently from the larger diameter helical gear to the smaller diameter helical gear, than from the smaller to the larger. Thus, turning to FIG. 1, drive is transmitted substantially less efficiently when in the direction from the smaller gear elements 21 and 23 to the larger gear members 28, 30, than when the direction of drive is reversed and drive is transmitted from the gear members 28, 30 to the gear elements 21,13.

The housing 1 is rotated about the common axis of the shafts 26,27 by a crown wheel and pinion (not shown) as is customary with a differential gear assembly.

OPERATION OF FIRST EMBODIMENT

When the vehicle to which the differential gear assembly is fitted is travelling in a straight line, the gear units 21,28 and 23,30 cannot rotate relative to one another because of their inter-connection through the meshing spur gears 16 and 17. The rotational drive of the housing 1 is then imparted directly to the output shafts 26 and 27.

If the vehicle is cornering, one of the half shafts, say the half shaft 27, will rotate faster than the other half shaft 26. The speed of rotation of the housing 1 will then be the mean of the speeds of rotation of the half shafts 26,27. The difference in the rotational speeds of the half shafts 26,27 and the housing is accommodated by the gear member 30 driving the gear element 23 in one direction with an acceptable efficiency, while the other gear member 28 drives the gear element 21 in the opposite direction, also with an acceptable efficiency. This follows from the fact that in both cases the drive is transmitted from the larger diameter gear to the smaller diameter gear. Such counter-rotation of the gear elements 21 and 23 is cancelled out by the rotation of the two meshing spur gears 16,17 in respectively opposite directions. The resultant differentialling action of the gear assembly takes place with the gear units under full driving torque. The efficiency of transmission of movement from the larger diameter helical gear members to the smaller diameter gear elements is typically 0.5.

If one of the drive wheels, say the one fitted to half-shaft 27, has insufficient ground adhesion to resist the driving torque in the half shaft, the half-shaft's torque falls accordingly. In a "free" differential in such circumstances there is a corresponding drop in torque in the other half-shaft and any surplus power is expended in generating spin in the wheel having poor ground adhesion, against the resistance of the wheel having good ground adhesion. However in the limited slip differential being described, the frictional forces across the gear assembly act against the equalisation of half-shaft torques in such circumstances and also act against the generation of wheel spin in the wheel fitted to half-shaft 27 thereby sustaining an imbalance of driving torques between the half-shafts 26 and 27. Transmission of torque from half-shaft 26 to half-shaft 27 is from gear member 28 to gear element 21, against and efficiency of 0.5. The gear element 21 transmits the torque through the meshed spur gears 16,17 to the gear element 23 which meshes with the gear member 30. However this drive is now transmitted from the smaller diameter gear element to the larger diameter gear member. As stated above, this is achieved only with a very much poorer efficiency which, typically, is only 0.1. The limited slip differential described is therefore above to sustain a torque imbalance between the two half-shafts in excess of a 90:10 ratio before the onset of wheel spin.

PREFERRED EMBODIMENT OF THE INVENTION

The embodiment of the invention described with reference to FIGS. 3,4,5,7 and 8, operates in the same way as the embodiment just described, but the layout of the assembly is different to enable the torque applied to each of the half shafts to be shared amongst a group of four helically-toothed gear elements each of which has more than one tooth convolution in continuous engagement with the associated gear member.

FIG. 3 shows a differential gear assembly housing 40 in longitudinal section. A half shaft 41 projects through an end cap 70 on one end of the housing 40, and carries a helically-toothed gear member 42 within the housing as in the embodiment already described. The opposite end of the housing is also fitted with an end cap 71 through which extends a half-shaft 48 carrying within the housing 40 a second gear member 47. The two gear members 41,48 are arranged in a spaced coaxial relationship with one another and are also coaxial with the axis of rotation of the housing which is rotatably driven by a conventional crown-and-pinion arrangement (not shown).

Figure 4:
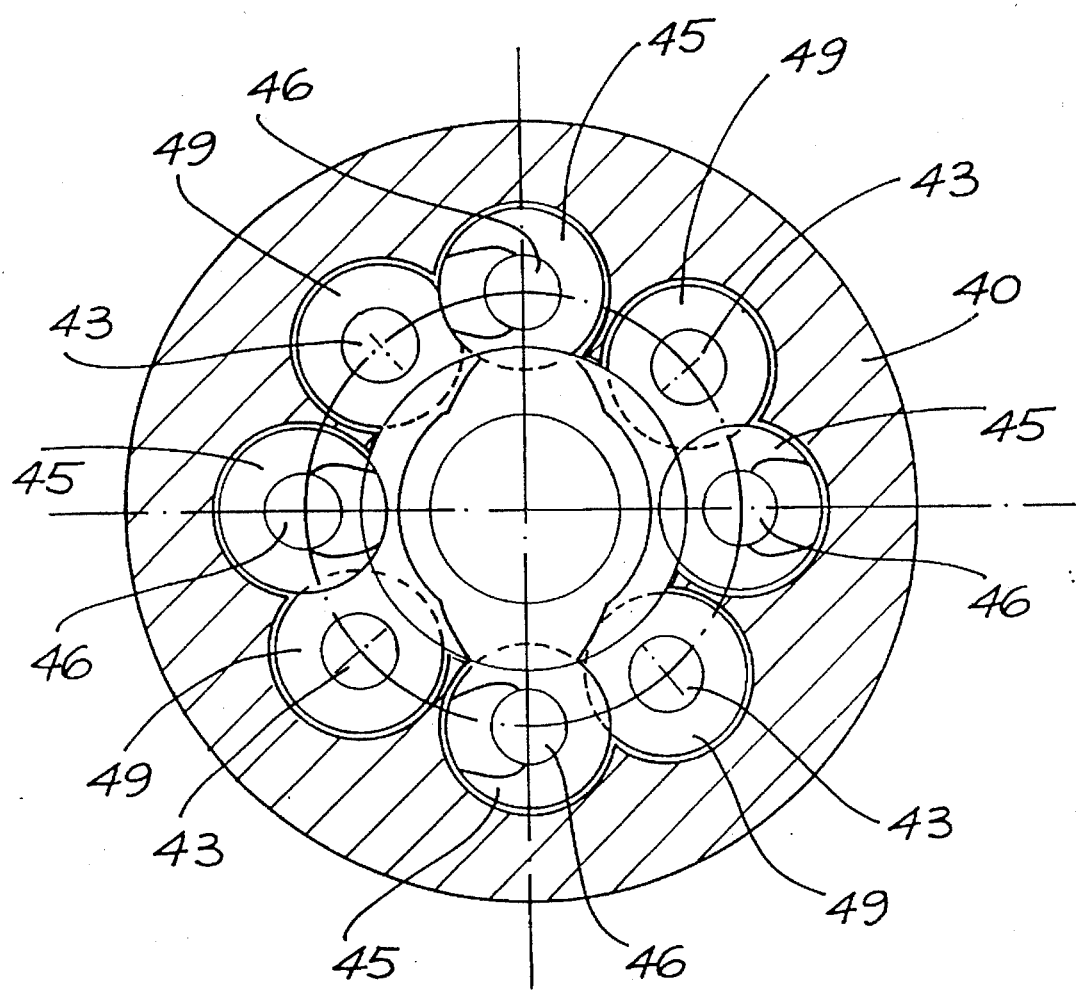
FIG. 4 is a vertical cross-section showing how the eight gear elements of FIG. 3 are arranged in two groups of four around two coaxial, spaced, helical gear members.

The housing 40 has a web 73 spanning diametrically across its central portion as shown in FIGS . 7 and 8, and is provided with a ring of axially-parallel wells 74 on one side and an offset ring of axially-parallel wells 76 on the other side. These wells overlap one another and, as shown in FIG. 4, accommodate respective pairs of meshing spur gears one spur gear of a pair being referenced 45 and the other spur gear of the pair being referenced 49. As shown in FIG. 8, a central aperture 78 in the web 73 provides a bearing for the adjacent ends 79 of the shafts 41,48. All of the bearings used are constructed as end-thrust bearings to absorb axial thrusts generated by the rotating components.

Four identical helically-toothed gear elements 43 as shown in FIG. 3, mesh with the gear member 42 at equispaced intervals around its circumference. Each of the elements 43 is of significantly smaller diameter than the gear member 42. The gear gear elements 43 and the gear member 42 are of the same hand and rotate in the same sense in the transmission of drive.

Figure 5:
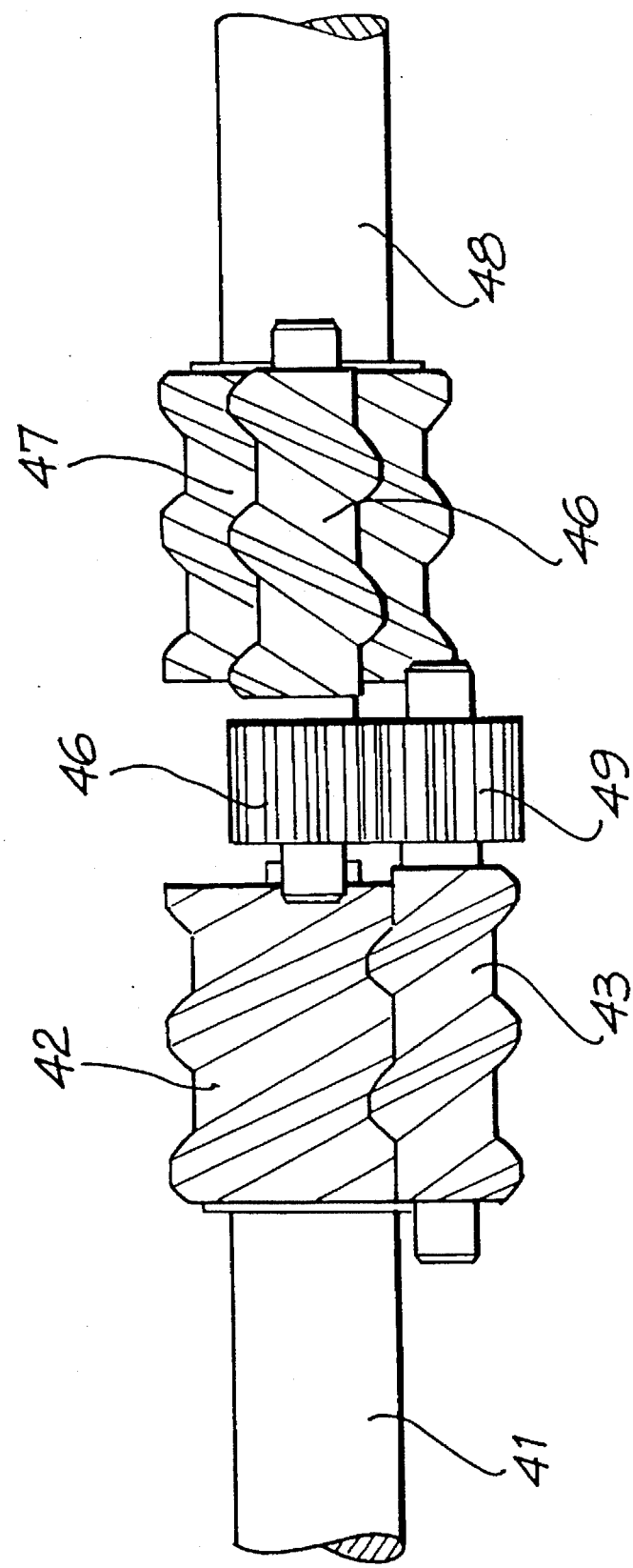
FIG. 5 is a detail drawing of part of FIG. 3 and shows how two of the gear elements associated with respective gear members, are inter-connected by spur gearing.

Each of the gear elements 43 carries one of the spur gears 49 at one end as clearly shown in FIG. 5. Each of the spur gears 49 meshes with a corresponding spur gear 45. The spur gears 45 are each mounted at one end of a gear element 46 which has its axis offset circumferentially with respect to the axes of the gear elements 43. Each gear element 46 is in mesh with a gear member 47 attached to the half shaft 48 projecting from the housing 71 at the opposite end of the housing 40. The extent of offsetting of the gear elements is apparent from FIG. 4. The gear member 42 is identical to the gear member 47. The spur gear pairs 45,49 are separate from one another and each pair is associated with a unique pair of gear elements 43,46.

OPERATION OF THE PREFERRED EMBODIMENT

Referring to FIG. 3, the rotational drive applied to the housing 40 is imparted to the half shafts 41,48 to tooth engagement between the gear elements 43,46 and the gear members 42,47.

As long as both driving wheels attached to the half shafts retain road traction, the torque output to each of the half shafts will balance at the spur gears 45,49. These spur gears thus act as fulcrums during differentially. During movement of the vehicle along a straight line, there is no rotation of the gear elements 43,46 relative to the gear members 42,47 and the driving torque to the two wheels is equal.

When the vehicle is cornering, the half shaft on the inside of the corner, say the half shaft 41, will rotate at a slower speed than that driving the outer wheel connected to the half shaft 48. The meshing gears in the housing will translate under load to compensate for the difference in speeds of rotation of the half shafts 41,48 with the housing 40 rotating at the mean of the two, half shaft speeds. Whilst output torque remains in balance at the spur gear fulcrums, there is an imbalance in torque between the inner half shaft 41 and the outer half shaft 48 generated by the friction between the gear elements and the gear members with which they are in mesh.

The meshing gears on both sides of the housing operate at the efficiency of the gear member driving the smaller diameter gear element. For a gear ratio of 2:1, such efficiency would typically be 0.70. The result is that the torque imparted to the inner half shaft 41 will be the balance torque at the spur gears supplemented by about 30%, and the torque imparted to the outer half shaft 48 will be the balance torque at the spur gears minus about 30%.

In traction to one of the drive wheels cannot resist the drive torque in the half shaft to which it is connected, there will be a tendency towards wheel spin. If this occurs, it causes frictional forces across the gear assembly to generate an imbalance in the half shaft driving torques, whereby the torque in the wheel exhibiting poor traction will be limited to the traction available at that wheel. The torque to the other wheel is increased to compensate.

The limit to the extent to which such imbalance can be generated is dependent upon the gear efficiency across the assembly as if one wheel were driving the other. This is referred to as the "torque bias ratio" of the differential which, in the preferred embodiment, is:

1:the efficiency of drive of the gear member driving its associated gear element, times the efficiency of drive of the gear element when driving its associated gear member.

The respective efficiencies of drive in opposite directions of drive transmission between the gear element and the gear member are typically 0.70 (as previously stated) and 0.15.

Putting the above values in the torque bias formula given above, the torque bias ratio becomes:

1: 0.70 times 0.15, or,

1:0.105

In practical terms, this means that the torque which can be resisted by the wheel having poor traction, may be multiplied ten times in the torque to the wheel retaining good traction, always provided that the traction of this latter wheel is sufficient to resist the increased drive torque.

It should also be pointed out that in the above simplified calculations the efficiency of the spur wheels has been disregarded as it is close to 100%.

It will be noted that each of the gear elements 43,46 in the assembly shown in FIG. 3 has two convolutions plus overlap in contact with the gear members 42,47. The strength this gives to the drive transmission for a given external radius of the housing 40, represents an improvement over prior art systems using crossed helical gearing, as only a single convolution plus overlap of the crossing gear can be in mesh at any one time with its gear member. Also, the number of crossed gears which can be used in practice is limited by the maximum diameter requirements of the housing.

VARIATION OF EITHER EMBODIMENT

Figure 6:
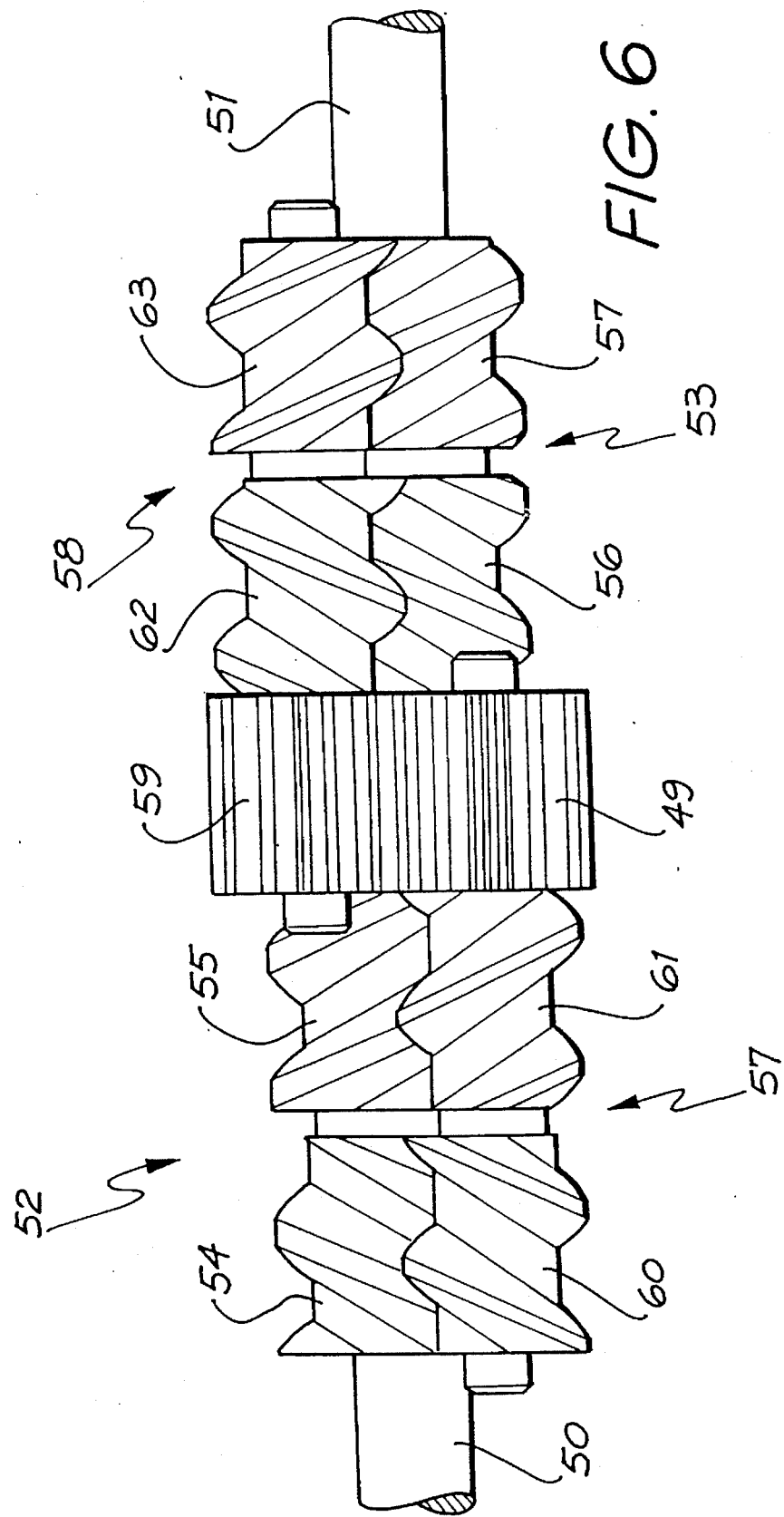
FIG. 6 is a second detail drawing corresponding to FIG. 5 but showing gear elements and gear members modified to generate self-cancelling axial thrusts.

FIG. 6 shows a technique which can be employed to reduce end thrusts on the housing and produced by the plus-plus characteristics of the gear elements in mesh with the gear members. In the figure, two half shafts are shown at 50,51 which extend respectively from opposite ends of the housing (not shown). Each half shaft has a gear member 52,53. Each gear member 52,53 has two axially spaced and helically-toothed sections 54,55 and 56,57, respectively. The teeth in the sections 54 and 55 spiral in the opposite direction to the teeth in the sections 56,57 as is illustrated, but are otherwise the same.

The gear members 52, 53 respectively mesh with gear elements 57,58 which are of extended length and each has two axially spaced sections in which the teeth spiral in opposite senses, as shown, so as to mesh with the corresponding helically-toothed sections of the gear members 52,53. The axially spaced sections of the gear element 57 are referenced 60 and 61, and those of the gear element 58 are referenced 62,63.

As previously mentioned, a characteristic of plus-plus gearing is that relatively high end thrusts on their shafts are produced. The arrangement of toothed sections shown in FIG. 6 divides the load equally between each pair of toothed sections and, as the teeth of one section extend in the opposite direction to those of the other section of the same gear, the end thrusts produced by the two sections of each gear act in opposite directions and are therefore self-cancelling.

FIG. 9 shows graphically the way the mechanical efficiency of a gear unit having meshing externally toothed helical gears of different diameters, changes with change in diameter of the meshing gears. The upper family of five curves show the efficiency of transmission of drive from the larger diameter gear to a smaller diameter of gear, when the ration of the diameters is different. These ratios are referenced R and have the values 1,2,3,5 and 7 for the respective curves.

A second family of curves is shown in broken outline and gives the mechanical efficiencies achieved in the gear units in which R is equal to 1.5,2,3 and 5, when the direction of drive through them is reversed, i.e. drive is transmitted from the smaller gear to the gear of larger diameter.

An advantage of all of the constructions of differential gear assemblies of the invention and described above, is that all rotational movement occurs about parallel axes. This is a potentially preferable system to the TORSEN assembly where components rotating about non-parallel axes have to be accommodated.

We claim:

1. A limited slip differential gear assembly, comprising a housing mounted for rotation about a first axis, means for coupling a rotational drive to said housing, two collinear and spaced gear members having external teeth and respectively mounted in opposite sides of said housing, and at least one pair of gear elements meshing respectively with each of the gear members and interconnected by spur gears which rotate with respective gear elements; in which gear assembly the axes of rotation of the gear members, the gear elements and spur gears extend parallel to one another and to the axis of rotation of the housing, and the gear elements and gear members have meshing helical teeth of the same hand with the gear members being of larger diameter than the gear elements.

2. An assembly as claimed in claim 1, in which each gear member has a symmetrical arrangement of gear elements meshing with it and having their axes of rotation lying on the same pitch circle and disposed between the rotational axes of a similar symmetrical arrangement of gear elements meshing with the second gear member, the assembly also including discrete pairs of meshing spur gears arranged with the two spur gears of each pair respectively connected to two gear elements one of which is in mesh with one of the gear members and the other of which is in mesh with the other gear member.

3. An assembly as claimed in claim 2, in which the housing has an intermediate web spanning across its interior and formed with cylindrical wells containing respective spur gears.

4. An assembly as claimed in claim 3, in which there are four pairs of spur gears.

5. An assembly as claimed in claim 1, in which each of the gear elements and the gear members have two axially spaced, helically-toothed sections in one of which the teeth spiral opposite-handedly to the teeth of the other section.

6. An assembly as claimed in claim 1, in which there are at least two convolutions of meshing teeth between each gear element and each gear member.

7. A limited slip differential gear assembly comprising:
a housing mounted for rotation about a first axis, the housing having an intermediate web spanning across its interior and formed with cylindrical wells,
means for coupling a rotational drive to said housing,
first and second collinear and spaced gear members having external helical teeth and respectively mounted to opposite sides of said intermediate web for rotation about axes that are parallel to said first axis,
a first group of gear elements having external helical teeth of the same hand as the first gear member and meshing with the first gear member, the gear elements of the first group being of smaller diameter than the first gear member, being symmetrically arranged relative to the first gear member, and having their axes of rotation parallel to said first axis and lying on a pitch circle,
a first group of spur gears which are connected to and rotate with respective gear elements of the first group about axes that are parallel to said first axis and are contained in respective wells of the intermediate web,
a second group of gear elements having external helical teeth of the same hand as the second gear member and meshing with the second gear member, the gear elements of the second group being of smaller diameter than the second gear member, being symmetrically arranged relative to the second gear member, and having their axes of rotation parallel to said first axis and lying on said pitch circle and disposed between the axes of rotation of the gear elements of the first group,
a second group of spur gears which are connected to and rotate with respective gear elements of the second group about axes that are parallel to said first axis and are contained in respective wells of the intermediate web, each spur gear of the second group being paired with a single spur gear of the first group and being meshed therewith, whereby each gear element of the first group is connected to a gear element of the second group.

8. An assembly as claimed in claim 7, wherein the intermediate web is formed with a first group of cylindrical wells open toward the first gear member and containing the first group of spur gears respectively and a second group of cylindrical wells open toward the second gear member and containing the second group of spur gears respectively.

9. An assembly as claimed in claim 7, wherein each spur gear and the gear element to which it is connected are formed by a single body that rotates about an axis that is parallel to said first axis.

10. An assembly as claimed in claim 7, in which each group of spur gears comprises four spur gears.

11. An assembly as claimed in claim 7, in which each gear element has two axially-spaced, helically-toothed sections of opposite hand, and the gear member meshing therewith has two axially spaced, helically toothed sections of opposite hand meshing with the two sections respectively of the gear element.

12. An assembly as claimed in claim 7, in which there are at least two convolutions of meshing teeth between each gear element and the gear member with which it meshes.

13. A limited slip differential gear assembly comprising:

a housing mounted for rotation about a first axis, means for coupling a rotational drive to said housing, first and second collinear and spaced gear members having external helical teeth and mounted in said housing for rotation about axes that are parallel to said first axis, at least one pair of first and second gear elements each having an axis of rotation parallel to said first axis, the first gear element being of smaller diameter than the first gear member and having an external helical tooth of the same hand as the first gear member and meshing with the first gear member, and the second gear element being of smaller diameter than the second gear member and having an external helical tooth of the same hand as the second gear member and meshing with the second gear member, a first spur gear which is connected to and rotates with said first gear element about an axis that is parallel to said first axis, a second spur gear which is connected to and rotates with said second gear element about an axis that is parallel to said first axis, said second spur gear being meshed with said first spur gear, whereby the first gear element is connected to the second gear element.

14. An assembly as claimed in claim 13, comprising a plurality of pairs of first and second gear elements, the first gear elements of the pairs respectively having a symmetrical arrangement around the first gear member and having their axes of rotation on a pitch circle, and the second gear elements of the pairs respectively having a symmetrical arrangement around the second gear member and having their axes of rotation between the axes of rotation of the first gear elements and lying on said pitch circle.

15. An assembly as claimed in claim 14, comprising a plurality of discrete pairs of matching spur gears with the two spur gears of each pair respectively connected to a first gear element and a second gear element.

16. An assembly as claimed in claim 15, in which the housing has an intermediate web between the first gear member and the second gear member.

17. An assembly as claimed in claim 16, wherein the intermediate web is formed with cylindrical wells containing the spur gears respectively.

18. An assembly as claimed in claim 16, in which there are four pairs of spur gears.

19. An assembly as claimed in claim 13, in which each gear element has two axially-spaced, helically-toothed sections of opposite hand, and the gear member meshing therewith has two axially spaced, helically toothed sections of opposite hand meshing with the two sections respectively of the gear element.

20. An assembly as claimed in claim 13, in which there are at least two convolutions of meshing teeth between each gear element and the gear member with which it meshes.

* * * * *